(12) United States Patent
Galvan et al.

(10) Patent No.: US 9,969,820 B2
(45) Date of Patent: May 15, 2018

(54) POLYPROPYLENE FILMS AND SHEETS

(75) Inventors: Monica Galvan, Ferrara (IT); Roberto Pantaleoni, Ferrara (IT); Ofelia Fusco, Ferrara (IT); Benedetta Gaddi, Ferrara (IT); Andreas Neumann, Ferrara (IT); Antonio Mazzucco, Ferrara (IT); Gianni Collina, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 207 days.

(21) Appl. No.: 14/126,279

(22) PCT Filed: Jun. 21, 2012

(86) PCT No.: PCT/EP2012/061922
§ 371 (c)(1),
(2), (4) Date: Dec. 13, 2013

(87) PCT Pub. No.: WO2013/004507
PCT Pub. Date: Jan. 10, 2013

(65) Prior Publication Data
US 2014/0121340 A1  May 1, 2014

Related U.S. Application Data

(60) Provisional application No. 61/503,935, filed on Jul. 1, 2011.

(30) Foreign Application Priority Data

Jul. 1, 2011 (EP) .................................. 11172391

(51) Int. Cl.
*C08F 4/16* (2006.01)
*C08J 5/18* (2006.01)
*B32B 27/08* (2006.01)
*B32B 27/32* (2006.01)

(52) U.S. Cl.
CPC ................ *C08F 4/16* (2013.01); *B32B 27/08* (2013.01); *B32B 27/32* (2013.01); *C08J 5/18* (2013.01); *B32B 2307/518* (2013.01); *B32B 2307/546* (2013.01); *B32B 2553/00* (2013.01); *C08J 2323/12* (2013.01)

(58) Field of Classification Search
CPC ..................................... C08F 4/16; C08J 5/18
USPC ..................................................... 526/125.3
See application file for complete search history.

(56) References Cited

U.S. PATENT DOCUMENTS

2002/0028898 A1* 3/2002 Kuramoto ............. C08F 110/06
526/351
2006/0264585 A1* 11/2006 Meesters ............... C08F 110/06
526/125.3
2010/0304068 A1* 12/2010 Ferrara .................... C08K 3/26
428/36.9
2014/0200316 A1   7/2014 Standaert et al.

FOREIGN PATENT DOCUMENTS

| CN | 1675254 A | 9/2005 |
| CN | 101421318 A | 4/2009 |
| CN | 101479304 A | 7/2009 |
| EP | 0728769 A1 | 8/1996 |
| WO | WO-2004013193 A2 | 2/2004 |
| WO | WO2010/146074 A1 | 12/2010 |
| WO | WO2011/061134 A1 | 5/2011 |

OTHER PUBLICATIONS

Ferraro et al., "Advances in Ziegler-Natta Catalysts for Polypropylene," Kinet. Catal., 2006, vol. 47, No. 2, pp. 176-185.*
PCT International Search Report & Written Opinion dated Jul. 24, 2012, for PCT/EP2012/061922.

* cited by examiner

*Primary Examiner* — Catherine S Branch

(57) ABSTRACT

Films or sheets of polypropylene, particularly biaxially oriented polypropylene (BOPP) films, exhibiting excellent physical and mechanical properties combined with good processing characteristics can be prepared from propylene polymers prepared in the presence of Ziegler-Natta catalysts comprising a succinate and a diether compound.

14 Claims, No Drawings

POLYPROPYLENE FILMS AND SHEETS

This application is the U.S. National Phase of PCT International Application PCT/EP2012/061922, filed Jun. 21, 2012, claiming priority of European Patent Application No. 11172391.2, filed Jul. 1, 2011, and the benefit under 35 U.S.C. 119(e) of U.S. Provisional Application No. 61/503,935 filed Jul. 1, 2011, the contents of which are incorporated herein by reference in their entirety.

FIELD OF THE INVENTION

The present invention relates to polypropylene films and sheets, particularly to biaxially oriented polypropylene films.

BACKGROUND OF THE INVENTION

Polypropylene has been since long extruded into sheets and films, depending on the thickness. Of particular interest are those film products that are subjected to orientation techniques and that show improved strength and clearness. Of particular interest are the biaxially oriented polypropylene (BOPP) films that are widely used in the packaging industry and in other applications. BOPP films are particularly suitable for food packaging applications in view of their set of properties: excellent barrier to moisture, resistance to grease and oil, to abrasion, good stiffness, tensile strength, impact and flexibility at low temperatures, gloss, printability and crispness.

Despite polypropylene films and sheets has been known for decades, there is still a wish to improve its properties. Also, due to recent regulatory restrictions on phthalates, it is desirable to make available polypropylene films and sheets that are free from phthalate residues coming from typical Ziegler-Natta catalysts used for their preparation.

International Application WO 2004/013193 discloses, in a comparative example, a bi-oriented film of a polypropylene prepared with a phthalate-free catalyst. While that film shows good mechanical properties, it is not a commercially interesting product due to the low content of stereoblocks of the polypropylene. In fact, film processing performance of the resin is known to be correlated with the amount of the stereoblock component that is crystalline and melts at a significantly lower temperature than the isotactic component.

SUMMARY OF THE INVENTION

Therefore, the present invention sets out to provide novel polypropylene films and sheets having an improved set of properties, particularly a suitable combination of mechanical properties and of processing characteristics, combined with the absence of phthalate residues.

It has now been found that those and other results can be achieved by using a polypropylene obtained by using a specific class of Ziegler/Natta catalysts.

Thus, according to a first aspect, the present invention provides a film or sheet comprising a polypropylene having a stereoblock content (determined by TREF method) of greater than 8 wt %, preferably of greater than 9 wt %, more preferably of greater then 10 wt %, a flexural modulus (determined according to ISO 178) of greater than 1600 MPa, preferably greater than 1650 MPa, such polypropylene being obtained by a polymerization process carried out in the presence of a catalyst system comprising the product obtained by contacting the following components:

a) a solid catalyst component comprising a magnesium halide, a titanium compound having at least a Ti-halogen bond and at least two electron donor compounds one of which being present in an amount from 40 to 90% by mol with respect to the total amount of donors and selected from succinates and the other being selected from 1,3 diethers,
b) an aluminum hydrocarbyl compound, and
c) optionally an external electron donor compound.

Due to the high amount of the stereoblock component in the polypropylene used in the preparation of the films and sheets of the present invention, the resulting films and sheets have very good processing performance.

As used herein, the term "stereoblock" means the crystalline structure of the polypropylene that has single polymerized monomer unit defects in the polymer chain such that the methyl group of the polymerized propylene monomer (the monomer unit defect) is in a different plane from the methyl group of the other polymerized propylene monomers.

Additionally, the films and sheets of the present invention are endowed with excellent physical and mechanical properties, particularly with high rigidity.

Among the films and sheets of the present invention, of particular interest are the oriented films, more particularly the biaxially oriented polypropylene (BOPP) films.

The polypropylene for use in preparing the films or sheets of the invention has the following preferred features:

Melt Flow Ratio (ISO 1133-230° C., 2.16 Kg) preferably higher than 1 g/10', more preferably of from 1 to 5 g/10', even more preferably 2.5 to 3.5 g/10';

Polydispersity Index preferably of from 3.5 to 6.5, more preferably of from 4.5 to 5.5;

a xylene insolubility preferably higher than 90%, more preferably higher than 92% and even more preferably higher than 94%;

an isotactic index in terms of content of isotactic pentads (mmmm—determined with C13-NMR) preferably higher than 92%, more preferably higher than 94%;

a molecular weight distribution, expressed by the $\overline{M}w/\overline{M}n$ ratio, measured by GPC, preferably higher than 5, more preferably higher than 7;

a value of $\overline{M}z/\overline{M}w$ ratio, measured by GPC, preferably higher than 2.5, more preferably higher than 3.5.

The polypropylene for use in the preparation of the films and sheets of the present invention is generally a homopolymer, but can contain minor amounts of comonomer units deriving from ethylene and/or other alpha-olefins such as C4-C10 alpha-olefins. The amount of comonomer units, when present, generally ranges from 0.1 to 2% by weight, preferably it ranges from 0.2 to 1.5% by weight.

The polypropylene for use in the preparation of the films and sheets of the present invention can also contain additives commonly employed in the art, such as antioxidants, light stabilizers, heat stabilizers, nucleating agents, colorants and fillers.

In the solid catalyst component (a) the succinate is preferably selected from succinates of formula (I) below:

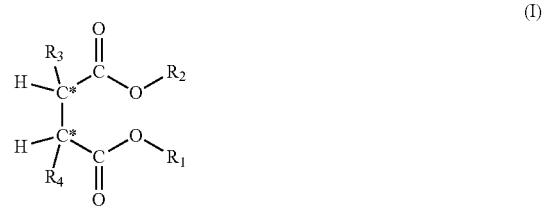

in which the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, C3-C20 cycloalkyl, C5-C20 aryl, arylalkyl or alkylaryl group with the proviso that at least one of them is a branched alkyl; said compounds being, with respect to the two asymmetric carbon atoms identified in the structure of formula (I), stereoisomers of the type (S,R) or (R,S)

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

Particularly preferred are the compounds in which the $R_3$ and/or $R_4$ radicals are secondary alkyls like isopropyl, sec-butyl, 2-pentyl, 3-pentyl or cycloakyls like cyclohexyl, cyclopentyl, cyclohexylmethyl.

Examples of the above-mentioned compounds are the (S,R) (S,R) forms pure or in mixture, optionally in racemic form, of diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Among the 1,3-diethers mentioned above, particularly preferred are the compounds of formula (II)

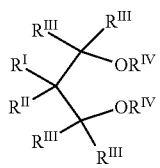

(II)

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1-6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

Furthermore, particularly preferred are the 1,3-diethers of formula (III)

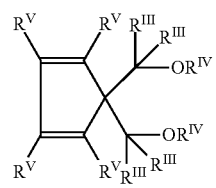

(III)

where the radicals $R^{IV}$ have the same meaning explained above and the radicals $R^{III}$ and $R^V$ radicals, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals and two or more of the $R^V$ radicals can be bonded to each other to form condensed cyclic structures, saturated or unsaturated, optionally substituted with $R^{VI}$ radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; said radicals $R^V$ and $R^{VI}$ optionally containing one or more heteroatoms as substitutes for carbon or hydrogen atoms, or both.

Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^V$ radicals are bonded to each other to form one or more condensed cyclic structures, preferably benzenic, optionally substituted by $R^{VI}$ radicals. Specially preferred are the compounds of formula (IV):

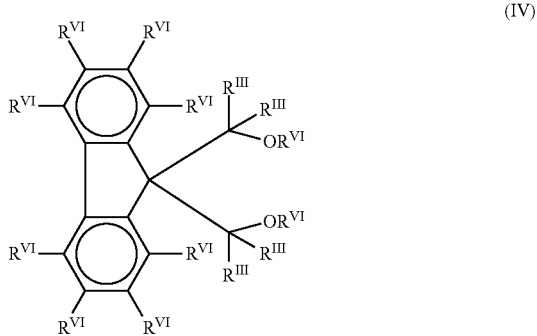

where the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, 0, S, P, Si and halogens, in particular Cl and F, as substitutes for carbon or hydrogen atoms, or both; the radicals $R^{III}$ and $R^{IV}$ are as defined above for formula (II).

Specific examples of compounds comprised in formulae (II) and (III) are:
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

As explained above, the catalyst component (a) comprises, in addition to the above electron donors, a titanium compound having at least a Ti-halogen bond and a Mg halide. The magnesium halide is preferably $MgCl_2$ in active form which is widely known from the patent literature as a support for Ziegler-Natta catalysts. U.S. Pat. No. 4,298,718 and U.S. Pat. No. 4,495,338 were the first to describe the use of these compounds in Ziegler-Natty catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n-1 X is halogen and R is a hydrocarbon radical having from 1 to 10 carbon atoms.

Preferably, the catalyst component (a) has an average particle size ranging from 15 to 80 μm, more preferably from 20 to 70 μm and even more preferably from 25 to 65 μm. As explained the succinate is present in an amount ranging from 40 to 90% by weight with respect to the total amount of donors. Preferably it ranges from 50 to 85% by weight and more preferably from 65 to 80% by weight. The 1,3-diether preferably constitutes the remaining amount.

The alkyl-Al compound (b) is preferably chosen among the trialkyl aluminum compounds such as for example triethylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-metil-dimethoxysilane. The external electron donor compound is used in such an amount to give a molar ratio between the organo-aluminum compound and said electron donor compound of from 5 to 500, preferably from 5 to 400 and more preferably from 10 to 200.

The catalyst forming components can be contacted with a liquid inert hydrocarbon solvent such as, e.g., propane, n-hexane or n-heptane, at a temperature below about 60° C. and preferably from about 0 to 30° C. for a time period of from about 6 seconds to 60 minutes.

The above catalyst components (a), (b) and optionally (c) can be fed to a pre-contacting vessel, in amounts such that the weight ratio (b)/(a) is in the range of 0.1-10 and if the compound (c) is present, the weight ratio (b)/(c) is weight ratio corresponding to the molar ratio as defined above. Preferably, the said components are pre-contacted at a temperature of from 10 to 20° C. for 1-30 minutes. The precontact vessel is generally a stirred tank reactor.

Preferably, the precontacted catalyst is then fed to a prepolymerization reactor where a prepolymerization step takes place. The prepolymerization step can be carried out in a first reactor selected from a loop reactor or a continuously stirred tank reactor, and is generally carried out in liquid-phase. The liquid medium comprises liquid alpha-olefin monomer(s), optionally with the addition of an inert hydrocarbon solvent. Said hydrocarbon solvent can be either aromatic, such as toluene, or aliphatic, such as propane, hexane, heptane, isobutane, cyclohexane and 2,2,4-trimethylpentane. The amount of hydrocarbon solvent, if any, is lower than 40% by weight with respect to the total amount of alpha-olefins, preferably lower than 20% by weight. Preferably, step (i)a is carried out in the absence of inert hydrocarbon solvents.

The average residence time in this reactor generally ranges from 2 to 40 minutes, preferably from 10 to 25 minutes. The temperature ranges between 10° C. and 50° C., preferably between 15° C. and 35° C. Adopting these conditions allows to obtain a pre-polymerization degree in the preferred range from 60 to 800 g per gram of solid catalyst component, preferably from 150 to 500 g per gram of solid catalyst component. Step (i)a is further characterized by a low concentration of solid in the slurry, typically in the range from 50 g to 300 g of solid per liter of slurry.

The slurry containing the catalyst, preferably in pre-polymerized form, is discharged from the pre-polymerization reactor and fed to a gas-phase or liquid-phase polymerization reactor. In case of a gas-phase reactor, it generally consists of a fluidized or stirred, fixed bed reactor or a reactor comprising two interconnected polymerization zones one of which, working under fast fluidization conditions and the other in which the polymer flows under the action of gravity. The liquid phase process can be either in slurry, solution or bulk (liquid monomer). This latter technology is the most preferred and can be carried out in various types of reactors such as continuous stirred tank reactors, loop reactors or plug-flow ones. The polymerization is generally carried out at temperature of from 20 to 120° C., preferably of from 40 to 85° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Preferably, the polymerization step is carried out by polymerizing propylene in liquid monomer, more preferably in loop reactor, to give the required propylene polymer.

In this stage, hydrogen can be used as a molecular weight regulator.

The films and sheets of the present invention can be prepared by well-know methods. For example, the BOPP films can be prepared by the tenter process, whereby the molten polymer materials are forced in continuous through a narrow slit. The extruded molten material is pulled away from the slit and cooled, then heated again and stretched both in the Machine Direction (MD), generally using heated rolls, and in the Transverse Direction (TD) with a tenter-frame. The film can be finally subjected to an annealing (heat set) treatment.

The thickness of the films of the present invention is generally lower than 250 µm, preferably comprised between 10 µm and 100 µm.

The films and sheets of the present invention can be monolayer or multilayer films. Accordingly, another object of the present invention is a multilayer laminated article comprising a film or sheet, particularly a BOPP film, of the present invention.

In the multilayer films, it is preferable that at least the base layer (also called "support layer") is according to the present invention. The other layer(s) may comprise other kinds of polymers.

Examples of olefin polymers that can be used for the other layers are polymers or copolymers, and their mixtures, of CH2=CHR olefins where R is a hydrogen atom or a C1-C8 alkyl radical. Particularly preferred are the following polymers:

a) isotactic or mainly isotactic propylene homopolymers, and homopolymers or copolymers of ethylene, like HDPE, LDPE, LLDPE;

b) crystalline copolymers of propylene with ethylene and/or C4-C10 alpha-olefins, such as for example 1-butene, 1-hexene, 4-methyl-1-pentene, 1-octene, wherein the total comonomer content ranges from 0.05% to 20% by weight with respect to the weight of the copolymer, or mixtures of said copolymers with isotactic or mainly isotactic propylene homopolymers;

c) elastomeric copolymers of ethylene with propylene and/or a C4-C10 alpha-olefin, optionally containing minor quantities (in particular, from 1% to 10% by weight) of a diene, such as butadiene, 1,4-hexadiene, I,5-hexadiene, ethylidene-I-norbornene;

d) heterophasic copolymers comprising a propylene homopolymer and/or one of the copolymers of item b), and an elastomeric fraction comprising one or more of the copolymers of item c), typically prepared according to known methods by mixing the components in the molten state, or by sequential polymerization, and generally containing the said elastomeric fraction in quantities from 5% to 80% by weight;

e) 1-butene homopolymers or copolymers with ethylene and/or other alpha-olefins.

Examples of polymers different from polyolefins, employable for the other layers, are polystyrenes, polyvinylchlorides, polyamides, polyesters and polycarbonates.

Finally, the films of the present invention can undergo a series of subsequent operations, such as:

surface embossing, by heating the surface compressing it against the embossing roller;

printing, after having made the surface ink sensitive through oxidating (for instance flame) or ionizing treatments (for instance corona discharge treatment);

coupling with fabric or film, particularly polypropylene, by heating of the surfaces and compression;

co-extrusion with other polymeric or metallic materials (e.g. aluminum film);

plating treatments (depositing a layer of aluminum through evaporation under vacuum, for example);

application of an adhesive layer on one of the two faces of the film, thus producing an adhesive film.

Depending upon the specific kind of film and final treatment, the films of the present invention can find many uses, the most important of which is goods and food packaging.

The BOPP films of the present invention exhibit excellent physical and mechanical properties, particularly high rigidity. More particularly, for a film thickness of around 20 µm, they show a tensile modulus of higher than 2000 MPa, preferably higher than 2100 Mpa, more preferably higher than 2200 Mpa.

The BOPP films of the present invention additionally possess good processing characteristics resulting from the high stereoblock content of the polypropylene resin.

EXAMPLES

The following examples are given to illustrate the present invention without any limiting purpose.

Methods

The characterization data for the propylene polymers and for the obtained films were obtained according to the following methods:

Flexural Modulus

Determined according to ISO 178.

Melt Flow Rate (MFR)

Determined according to ISO 1133 (230° C., 2.16 Kg).

Polydispersity Index (PI)

Determined according to ISO 6721-10 method. PI is calculated by way of a dynamic test carried out with a RMS-800 rheometric mechanical spectrometer. The PI is defined by the equation $$PI=10^5/Gc,$$

where the Gc (crossover modulus) value is the one where G' (storage modulus) coincides with G" (loss modulus). A sample is prepared with one gram of polymer, said sample having a thickness of 3 mm and a diameter of 25 mm; it is then placed in the above mentioned apparatus and the temperature is then gradually increased until it reaches a temperature of 200 C after 90 minutes. At this temperature one carries out the test where G' and G" are measured in function of the frequency.

Xylene Solubles (XS)

Determined as follows: 2.5 g of polymer and 250 ml of xylene are introduced in a glass flask equipped with a refrigerator and a magnetical stirrer. The temperature is raised in 30 minutes up to the boiling pint of the solvent. The so obtained clear solution is then kept under reflux and stirring for further 30 minutes. The closed flask is then kept in thermostatic water bath at 25° C. for 30 minutes. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Molecular Weight ($\overline{M}_n$, $\overline{M}_w$, $\overline{M}_z$)

Measured by way of gel permeation chromatography (GPC) in 1,2,4-trichlorobenzene.

Determination of Isotactic Pentads Content

Determined as follows: 50 mg of each xylene insoluble fraction were dissolved in 0.5 mL of $C_2D_2Cl_4$. The $^{13}C$ NMR spectra were acquired on a Bruker DPX-400 (100.61 Mhz, 90° pulse, 12 s delay between pulses). About 3000 transients were stored for each spectrum; mmmm pentad peak (21.8 ppm) was used as reference. The microstructure analysis was carried out as described in literature (Polymer, 1984, 25, 1640, by Inoue Y. et Al. and Polymer, 1994, 35, 339, by Chujo R. et Al.).

Temperature Raising Elution Fractionation (TREF) Method

The stereoblock content is determined by TREF fractionation of the polymer carried out by dissolving 1 g of propylene polymer in o-xylene at 135° C. and slowly cooling (20 h) to 25° C. in a column loaded with glass beads. Elution with o-xylene (600 mL/h) is first carried out at 25° C. for 1 h to obtain a xylene-soluble fraction. The column temperature is then raised from 25 to 95° C. at a rate of 0.7° C./min without elution and the temperature is held at 95° C. for 2 h before eluting at this temperature for 1, hour to yield a single fraction. Finally, elution is continued while raising the temperature from 95 to 120° C. at a rate of 3° C./h, collecting individual fractions at temperature intervals of 10 C. According to the present invention the stereoblock content is considered as the total weight of the fractions, insoluble in xylene at 25° C. that are eluted at a temperature up to 95° C.

Tensile Modulus on BOPP Film

Determined according to ASTM D882. Elastic Modulus on BOPP film samples is calculated by drawing a tangent to the initial linear portion of the load-extension curve, selecting any point on this tangent, and dividing the tensile stress by the corresponding strain. For purposes of this determination, the tensile stress is calculated by dividing the load by the average original cross section of the test section. The result is expressed in force per unit area, usually MPa.

Examples 1 to 4

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2.2.1C_2H_5OH$ having average particle size of 47 µm (prepared in accordance with the method described in example 1 of EP728769, an amount of diethyl 2,3-diisopropylsuccinate such as to have a Mg/succinate molar ratio of 15 was added. The temperature was raised to 100° C. and kept at this value for 60 min. After that the stirring was stopped, the liquid was siphoned off. After siphoning, fresh $TiCl_4$ and an amount of 9,9-bis (methoxymethyl)fluorene such as to have a Mg/diether molar ratio of 30 were added. Then the temperature was raised to 110° C. and kept for 30 minutes under stirring. After sedimentation and siphoning at 85° C., fresh TiCl4 was added. Then the temperature was raised to 90° C. for 15 min. After sedimentation and siphoning at 90° C. the solid was washed six times with anhydrous hexane (6×100 ml) at 60° C.

Preparation of the Catalyst System

Before introducing it into the polymerization reactors, the solid catalyst component described above is contacted with aluminum-triethyl (TEAL) with or without cyclohexyl-methyl-dimethoxysilane (CHMMS) at a temperature of 15° C. under the conditions reported in Table 1.

Prepolymerization

The catalyst system is then subject to prepolymerization treatment at 20° C. by maintaining it in suspension in liquid propylene for a residence time of 9 minutes before introducing it into the polymerization reactor.

Polymerization

The polymerization was carried out in continuous mode in a liquid phase loop reactor. The polymerization reactor was. Hydrogen was used as molecular weight regulator.

The main polymerization conditions are reported in Table 1. The analytical data relating to the polymers produced are reported in Table 2.

Preparation of BOPP Film

From pellet samples of the obtained polypropylenes, several plaques 950 μm to 1050 μm thick with size 60 mm×60 mm were obtained via compression moulding. By a film stretcher kept at 150±5° C. 5 specimen with the listed dimensions were simultaneously oriented at a fixed stretch ratio of 7 times in machine direction and 7 times in transverse machine direction. Final film thickness of the biaxially oriented film is around 20 μm. Yield strength and % breakage was recorded. All the stretched specimens were characterized at several temperatures, by lowering the temperature of 5° C. until all the 5 specimen broke.

The characteristics of the BOPP films are reported in Table 2.

Comparative Example 1

A BOPP film was prepared as in Examples 1-4, but using a commercial polypropylene Moplen HP525J (LyondellBasell), obtained from a phthalate-containing Ziegler-Natta catalyst and designed for the production of BOPP films. The characteristics of the polymer and of the obtained oriented film, reported in Table 2, show that it has worst mechanical properties, notably a lower rigidity, with respect to the films of the invention.

TABLE 1

Polymerization conditions

|  |  | Ex. 1 | Ex. 2 | Ex. 3 | Ex. 4 |
|---|---|---|---|---|---|
| External Donor |  | none | none | none | CHMMS |
| TEAL/Donor |  | 0 | 0 | 0 | 290 |
| TEAL/C3- |  | 0.16 | 0.09 | 0.17 | 0.15 |
| Temperature | ° C. | 74 | 74 | 70 | 70 |
| Residence time | min | 79 | 75 | 77 | 70 |
| H2 fed conc | mol ppm | 605 | 606 | 597 | 640 |
| Mileage | Kg/g | 58 | 66 | 59 | 51 |

TABLE 2

Polymer and film characteristics

|  |  | Ex. 1 | Ex. 2 | Ex. 3 | Ex. 4 | Comp. Ex. 1 |
|---|---|---|---|---|---|---|
| MFR | g/10' | 2.7 | 2.5 | 2.9 | 2.5 | 2.9 |
| XS | wt % | 4.7 | 4.7 | 5 | 3.8 | 4.5 |
| PI |  | 4.8 | 5.0 | 5.2 | 5.0 | 4.6 |
| Flexural Modulus | MPa | 1653 | 1686 | 1620 | 1695 | 1542 |
| Mw/Mn |  | 9.3 | 10.3 | 8.5 | 8.2 | 9 |
| Mz/Mw |  | 4.2 | 3.9 | 4 | 3.7 | 3.9 |
| mmmm | % | 95.4 | 95.7 | 94.9 | 96 | 96 |
| Stereoblocks up to 95° C. | wt % | 10.6 | 10.3 | n.a. | n.a. | 11.0 |
| Tensile Modulus.MD | MPa | 2480 | 2780 | 2350 | 2584 | 1900 | n.a. = not available

What is claimed is:

1. A process for producing a polypropylene article comprising the steps of:
    a) contacting propylene monomer and a catalyst system in a polymerization reactor, wherein the catalyst system comprises
        a solid catalyst component comprising a magnesium halide, a titanium compound having at least a Ti-halogen bond and at least two electron donor compounds, the first comprising succinates at a concentration of 40-90% by mol with respect to the total amount of electron donor concentration, and the second 1,3-diethers;
        an aluminum hydrocarbyl compound; and
        an external electron donor compound,
    wherein the polypropylene is characterized by the absence of phthalate residues; and
    b) shaping the polypropylene into an article,
    wherein the polypropylene article has a stereoblock content of greater than 10 wt. %, and a flexural modulus (ISO 178) of greater than 1650 MPa.

2. The process of claim 1, wherein the polypropylene article is an oriented film.

3. The process of claim 1, wherein the polypropylene article is a biaxially oriented film comprising a tensile modulus greater than 2000 MPa.

4. The process of claim 1, wherein the polypropylene has a melt flow rate from 1-5 g/10 min.

5. The process of claim 1, wherein the polypropylene has an isotactic index higher than 92%.

6. The process of claim 1, wherein the polypropylene has a molecular weight distribution higher than 5.

7. The process of claim 1, wherein the polypropylene has a value of $\overline{Mz}/\overline{Mw}$ ratio higher than 2.5.

8. The process of claim 1, wherein the article is a multilayer laminated article, and wherein the multilayer laminated article comprises a film or sheet.

9. The process of claim 8, wherein the film is a biaxially oriented film.

10. The process of claim 8, wherein the film or sheet further comprises at least one additive selected from antioxidants, light stabilizers, heat stabilizers, nucleating agents, colorants and fillers.

11. The process of claim 1, wherein the polypropylene has a polydispersity index in a range of 3.5-6.5.

12. The process of claim 1, wherein the polypropylene has a polydispersity index in a range of 4.5 to 5.5.

13. The process of claim 1, wherein the polypropylene has a xylene insolubility higher than 90%.

14. The process of claim 1, wherein the polypropylene has a tensile modulus of greater than or equal to 2350 MPa.

* * * * *

UNITED STATES PATENT AND TRADEMARK OFFICE
CERTIFICATE OF CORRECTION

PATENT NO.         : 9,969,820 B2
APPLICATION NO.    : 14/126279
DATED              : May 15, 2018
INVENTOR(S)        : Galvan et al.

It is certified that error appears in the above-identified patent and that said Letters Patent is hereby corrected as shown below:

In the Specification

In Column 1, Line 62, delete "then" and insert -- than --.

In Column 5, Line 14, delete "$OR^{VI}$" and insert -- $OR^{IV}$ --.

In Column 5, Line 16, delete "$OR^{VI}$" and insert -- $OR^{IV}$ --.

In Column 7, Line 64, delete "well-know" and insert -- well-known --.

In Column 9, Line 57, delete "pint" and insert -- point --.

In Column 10, Line 57, after "9," insert -- ) --.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*